US011734205B2

(12) United States Patent
Jacob et al.

(10) Patent No.: US 11,734,205 B2
(45) Date of Patent: *Aug. 22, 2023

(54) PARALLEL ITERATOR FOR MACHINE LEARNING FRAMEWORKS

(71) Applicant: MICRON TECHNOLOGY, INC., Boise, ID (US)

(72) Inventors: Jacob Mulamootil Jacob, Cedar Park, TX (US); Gaurav Sanjay Ramdasi, Pune (IN); Nabeel Meeramohideen Mohamed, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,545

(22) Filed: Jan. 11, 2022

(65) Prior Publication Data

US 2022/0138127 A1    May 5, 2022

Related U.S. Application Data

(63) Continuation of application No. 16/722,408, filed on Dec. 20, 2019, now Pat. No. 11,221,973.

(51) Int. Cl.
*G06F 13/16* (2006.01)
*G06F 9/46* (2006.01)
*G06N 3/04* (2023.01)
*G06N 3/08* (2023.01)

(52) U.S. Cl.
CPC .......... *G06F 13/1668* (2013.01); *G06F 9/466* (2013.01); *G06N 3/04* (2013.01); *G06N 3/08* (2013.01)

(58) Field of Classification Search
CPC ....... G06F 13/1668; G06F 9/466; G06N 3/04; G06N 3/08
See application file for complete search history.

(56) References Cited

U.S. PATENT DOCUMENTS

| 9,027,022 | B2 * | 5/2015 | Huetter | G06F 9/5066 718/1 |
| 9,778,856 | B2 * | 10/2017 | Fan | G06F 3/064 |
| 2008/0037581 | A1 * | 2/2008 | Asano | H04L 49/602 370/466 |
| 2015/0331724 | A1 * | 11/2015 | Sahu | G06F 9/5083 718/104 |
| 2017/0031599 | A1 * | 2/2017 | Bowman | G06F 3/0607 |
| 2018/0293493 | A1 * | 10/2018 | Kalamkar | G06T 1/20 |
| 2020/0210103 | A1 * | 7/2020 | Sforzin | G11C 13/0004 |

* cited by examiner

*Primary Examiner* — Nimesh G Patel
(74) *Attorney, Agent, or Firm* — Lowenstein Sandler LLP

(57) ABSTRACT

A request to retrieve data from a memory device of a memory sub-system can be received from a machine learning (ML) framework executing on a host system, where the data comprises a plurality of logical partitions. A set of parallel I/O threads can be initiated to retrieve the data from the memory device, where each I/O thread of the set of parallel I/O threads retrieves a different portion of the data from a different corresponding logical partition and stores the different portion of the data in a I/O buffer of a set of I/O buffers corresponding to the set of I/O threads in parallel. The different portion of the data can be successively provided from each I/O buffer to the ML framework, where the set of parallel I/O threads is to continually retrieve the data from the memory device until all of the data from the logical partitions has been provided to the ML framework.

20 Claims, 8 Drawing Sheets

PARALLEL ITERATOR FOR MACHINE LEARNING FRAMEWORKS

RELATED APPLICATION

This application is a continuation of and claims priority to U.S. patent application Ser. No. 16/722,408, filed Dec. 20, 2019, the entire content of which is hereby incorporated by reference.

TECHNICAL FIELD

The present disclosure generally relates to a memory sub-system, and more specifically, relates to parallel processing of data for machine learning frameworks for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
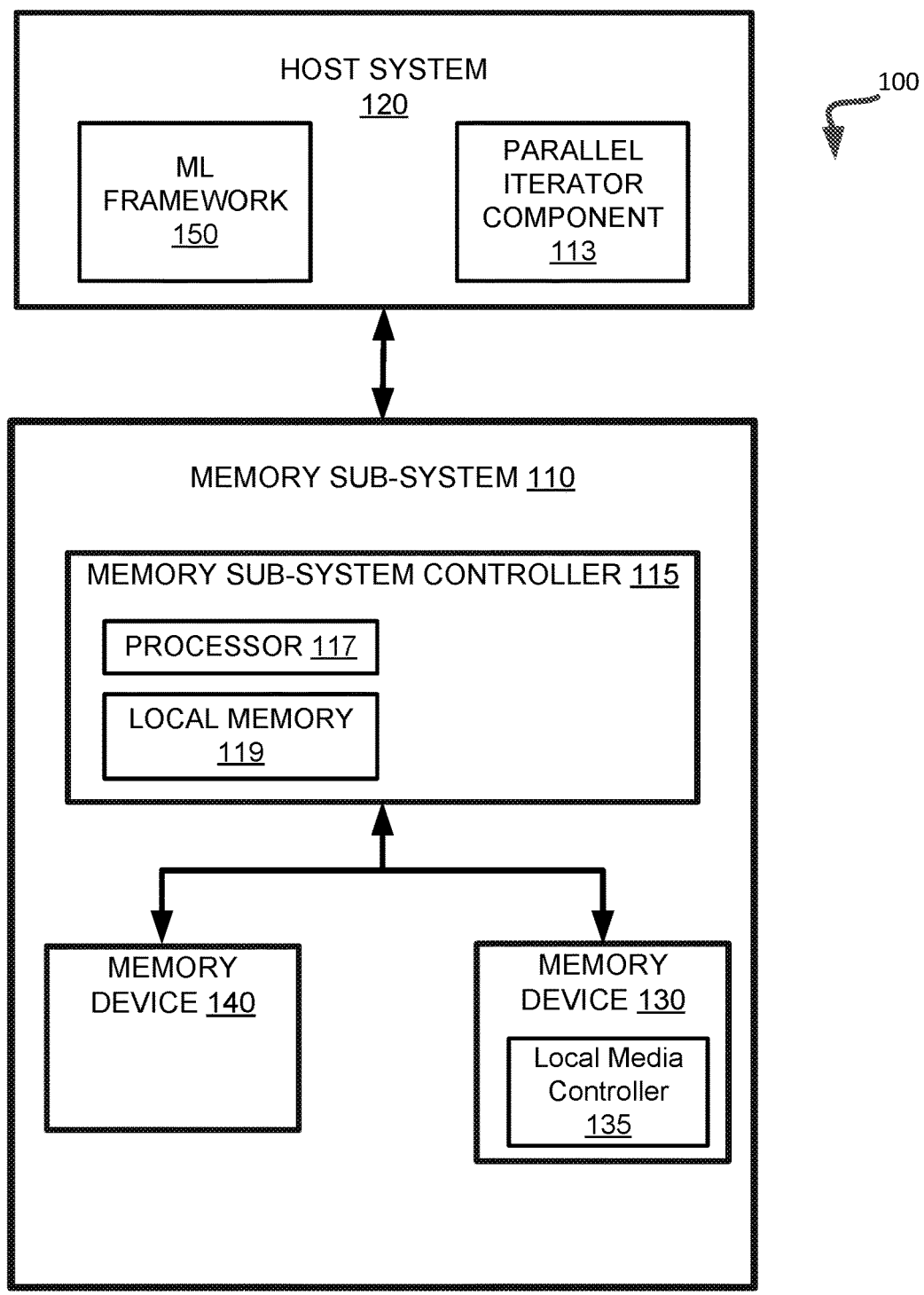
FIG. 1 illustrates an example computing system that includes a memory sub-system in accordance with some embodiments of the present disclosure.

Aspects of the present disclosure are directed to parallel processing of data for machine learning frameworks in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can include memory devices that can be used to store data used to train machine learning (ML) and artificial intelligence (AI) frameworks. Conventional ML/AI frameworks include a model, which is a representation of a neural network designed to receive as input example data and classify the example data into a particular type or class. In such frameworks, the amount of data used to train the ML models can be extremely large and a training process cycle can be executed multiple times (e.g., multiple "epochs"). For example, an ML framework used to classify an image as being a particular type of image (e.g., an image of a person, an animal, a type of animal, etc.) can utilize a large data set of stored images that are repeatedly processed in multiple epoch cycles to train the model. Similarly, data sets used for testing and/or inference stages of a ML/AI workflow can include very large amounts of data.

Conventional memory sub-systems that are configured to store training data (or testing/inference data) for ML frameworks typically provide the data to the ML frameworks in a single threaded manner. In such cases, the performance of an epoch that utilizes large amounts of data (such as image data) can be degraded both in terms of elapsed time and processing resources needed to retrieve the data from the memory sub-system. Some conventional implementations address the performance issues by implementing memory devices with faster read times. In some cases, where the memory devices are faster than the processors of the ML framework receiving and processing the data, storage bottlenecks can be reduced. In many ML frameworks, however, where the models are not mathematically complex, the processors of the framework can often process the data much faster than the data can be provided by a single threaded data retrieval process.

Aspects of the present disclosure address the above and other deficiencies by implementing a parallel iterator for a machine learning framework that can configure ML training data into logical partitions, then subsequently initiate multiple input/output (I/O) threads to retrieve the stored data in parallel. The parallel iterator can be implemented as an interface component between the ML framework and a connected memory sub-system to store data such that the logical partitions for the data can be configured based on the media type included in the memory subsystem. Responsive to a request to retrieve the data, the parallel iterator can initiate an I/O thread for each logical partition, and executing in parallel, can retrieve data from the logical partitions to be returned to the ML framework.

Advantages of the present disclosure include, but are not limited to, significantly improved throughput performance when retrieving large data sets from a memory subsystem configured with memory devices configured with multiple I/O queues. Implementing the parallel iterator of the present disclosure can utilize multiple I/O threads to leverage the multiple I/O queue configuration of memory devices to improve data throughput to an ML framework. Additionally, since the performance of the data retrieval process for the memory device is improved, the performance of a memory sub-system that includes the memory device also improves, since fewer resources are used to perform unneeded seasoning cycles. Moreover, aspects of the present disclosure can prevent bottlenecks where the processing speeds of the processors of the framework (e.g., CPUs/GPUs) approach levels that exceed those of the storage and/or memory subsystem.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 110 can include a machine learning (ML) framework 150 to execute one or more ML models. In various implementations, ML 150 can include frameworks such as Caffe 2, TensorFlow, PyTorch, or the like. Host system 110 can additionally include parallel iterator 113 that can be invoked by ML framework 150 to configure, store, and subsequently retrieve training data utilized by ML framework 150. In some implementations, Host system 110 can include at least a portion of parallel iterator component 113. For example, the host system can include a processor (e.g., a processing device) configured to execute instructions stored in a local memory of the host system 120 for performing the operations described herein. In some embodiments the parallel iterator component 113 is part of the host system 120, an application, or an operating system. In some implementations, the memory sub-system controller 115 includes at least a portion of the parallel iterator component 113. For example, the memory sub-system controller 115 can include a processor 117 (e.g., a processing device) configured to execute instructions stored in local memory 119 for performing the operations described herein.

The parallel iterator component 113 can receive training data for ML framework 150 to be stored on memory devices 130, 140 of memory sub-system 110. In various implementations, the memory devices 130, 140 can be configured with multiple parallel (I/O) queues (e.g., an NVMe memory device with larger queue depths). The parallel iterator component 113 can determine logical partitions for the received data and store the data on memory devices 130, 140 across the determined logical partitions. Subsequently, the parallel iterator component 113 can receive a request from ML 150 to retrieve the stored training data from the memory devices 130, 140. Parallel iterator component 113 can initiate a set of parallel I/O threads to retrieve the data, where each of the set of parallel I/O threads retrieves a different portion of the data from a different corresponding logical partition, and can store that data in an I/O buffer that corresponds to the particular I/O thread. The parallel iterator component 113 can then successively provide the data from the I/O buffers in a round robin fashion until all of the data from the logical partitions has been provided to the ML framework 150. Further details with regards to the operations of the parallel iterator component 113 are described below.

Figure 2:
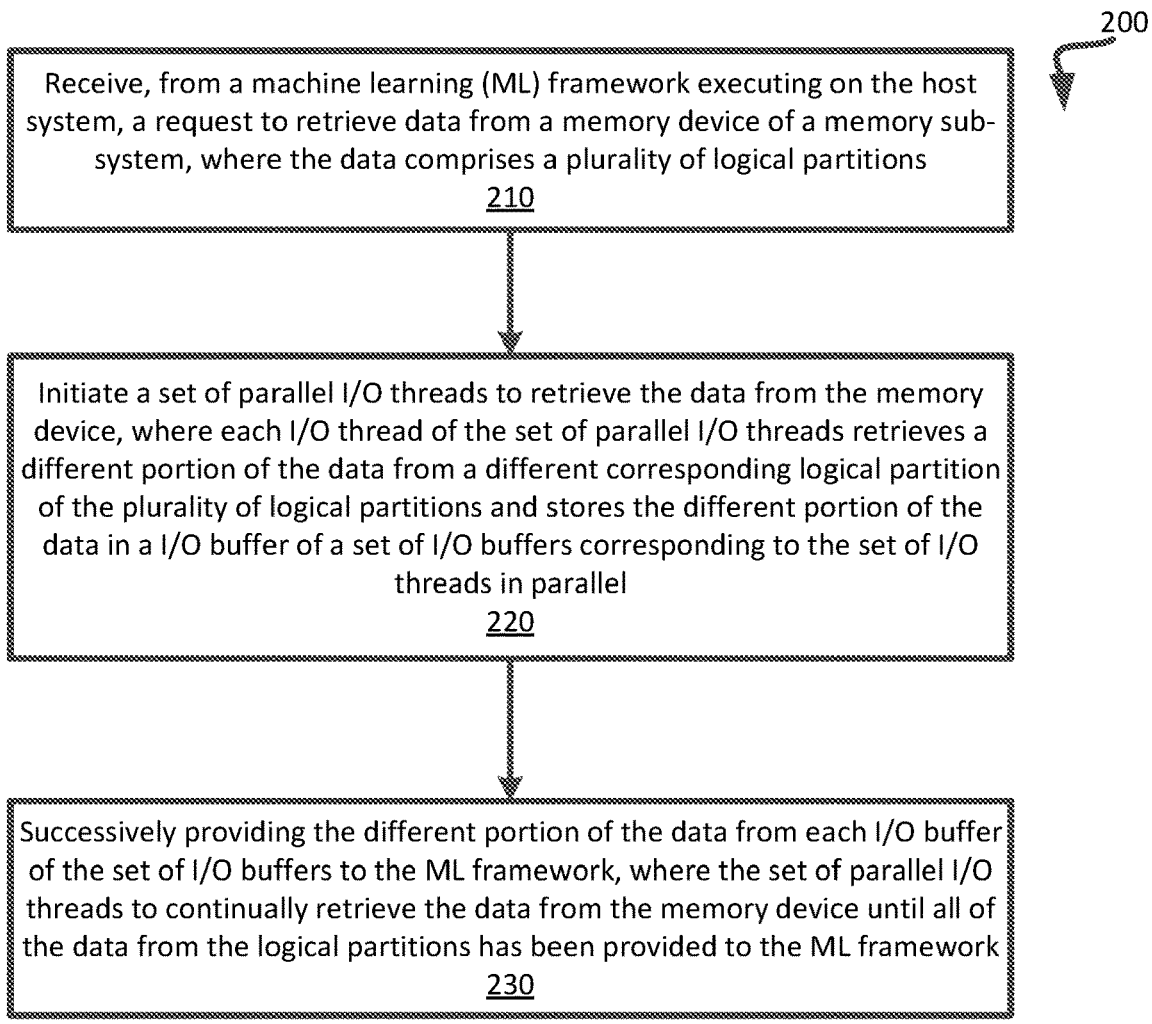
FIG. 2 is a flow diagram of an example method to initiate multiple I/O threads in parallel to retrieve logically partitioned data in accordance with some embodiments.

FIG. 2 is a flow diagram of an example method 200 to initiate multiple I/O threads in parallel to retrieve logically partitioned data for a memory sub-system in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the parallel iterator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives, from a machine learning (ML) framework executing on a host system, a request to retrieve data from a memory device of a memory sub-system. In some implementations, the ML framework sends the request to retrieve training data stored on the memory device to train the ML framework. The data can be stored on the memory device in a database configured for the memory device. For example, the data can be stored in a key-value data store where the key represents an index to a data element and the value represents the actual data to be stored. As noted above, the training data can be configured to include multiple logical partitions. In some implementations, the training data can be stored on the memory device such that the portion of the training data stored in each logical partition is associated with a unique identifier (or "prefix code") that identifies the partition. The prefix code for the partition can be stored as a part of the key for a data element so to identify the partition for that data element. By organizing the data in logical partitions, the process of data retrieval can be optimized for memory devices configured with multiple parallel I/O queues (e.g., a non-volatile memory express (NVMe) device with larger queue depths). An example method for configuring training data into logical partitions on such a memory device is described below with respect to FIG. 4.

At operation 220, the processing logic initiates a set of parallel I/O threads to retrieve the data from the memory device. Each I/O thread of the set of parallel I/O threads retrieves a different portion of the data from a different corresponding logical partition. Each I/O thread subsequently stores its associated retrieved portion of the data into an I/O buffer that is associated with the particular thread. In an illustrative example, responsive to receiving the request to retrieve the training data, the processing device can initiate a process to read the data from the data store of the memory device. In various implementations, the processing device can create a cursor to read the data from the memory device. A database cursor is a control structure that enables traversal over the records in a database. Cursors can facilitate subsequent additional processing such as retrieval, addition and removal of database records. A cursor can be used by an application program to process individual rows returned by database system queries. Additionally, a cursor can allow manipulation of entire result sets at once, which can enable the sequential processing of rows in a result set. The processing device creating the cursor can subsequently initiate the creation of a main iterator thread to monitor the I/O buffers and the parallel I/O threads to retrieve the data from the partitions into their associated I/O buffers.

In some implementations, the processing device can determine the number of parallel I/O threads to be initiated based at least in part on the media type of the media device. For example, the processing device can determine the number of parallel I/O queues supported by an NVMe device and set the number of I/O threads based on that number. Additionally, the processing device can determine the queue depths associated with the parallel I/O queues. Alternatively, the processing device can select a fewer number of parallel I/O queues than that supported by the NVMe device based on observed performance statistics associated with the type of device. For example, if observed historical performance of similar types of NVMe devices indicate that data retrieval is optimized with a particular number of parallel I/O threads, this number can be stored in firmware (or other configuration data for the device) and retrieved by the processing device to drive the thread initiation process.

In other implementations, the processing logic can determine the number of parallel threads to be initiated based on the number of logical partitions associated with the data to be retrieved. For example, the processing device can retrieve information from the data store that indicates the number of logical partitions for the training data, and initiate an I/O thread for each of the logical partitions. In some implementations, the processing logic can use a combination of the above factors. For example, the processing logic can determine the number of I/O threads supported by the media type of the memory device, then determine the number of logical partitions associated with the data to be retrieved. In such cases, where there are fewer partitions than the number of threads supported by the media type, the processing logic can limit the number of I/O threads to the number of threads needed to process the applicable logical partitions for the data.

In some implementations, the amount of data associated with a logical partition can be greater than the size of the I/O buffer for the I/O thread that retrieves the data from the logical partition. In such instances, the I/O thread associated with the logical partition can retrieve a portion of the data for the partition and store it in the buffer. Once an I/O buffer has been filled, its associated I/O thread can pause the data retrieval process for that partition until the I/O buffer has been emptied by the main iterator thread and provided to the ML framework.

At operation 230, the processing logic successively provides the different portion of the data from each I/O buffer of the set of I/O buffers to the ML framework. In various implementations, the set of parallel I/O threads is to continually retrieve the data from the memory device until all of the data from the logical partitions has been provided to the ML framework. As noted above, each I/O thread can retrieve a portion of data from its assigned logical partition and stores that portion of data into its associated I/O buffer. Once an I/O buffer has been filled, the I/O thread waits for the I/O buffer to be emptied before retrieving additional data for that logical partition.

While the parallel I/O threads retrieve data from the logical partitions and store the data in the associated I/O buffers, the main iterator thread can retrieve the data stored in each I/O buffer and provide that data to the ML framework. In some implementations, the main iterator thread can provide the different portions of the data from each I/O buffer in a round robin scheduling scheme.

In an illustrative example, the processing device can initiate a first parallel I/O thread to retrieve data from a first logical partition and a second parallel I/O thread to retrieve data from a second logical partition. The first parallel I/O thread can retrieve a portion of the data from the first logical partition into an I/O buffer for that thread. The second parallel I/O thread can retrieve a portion of the data from the second logical partition into a separate I/O buffer for the second I/O thread. The processing device can also initiate the main iterator thread to cycle through the I/O buffers in a round robin fashion to retrieve the data from the buffers and provide the data to the ML framework. For example, the main iterator thread can empty the first I/O buffer and provide that data to the ML framework. Once the first buffer has been emptied, the main iterator thread can proceed to the second I/O buffer to provide the data in that buffer to the ML framework. As the iterator thread is providing the data from the second I/O buffer to the ML framework, the first I/O thread can resume retrieving data from the first logical partition into the first I/O buffer. The process can be repeated until all of the data has been retrieved from all logical partitions and provided to the ML framework.

In an alternative example, the main iterator thread can retrieve records from I/O buffers one by one from each I/O buffer in a round robin fashion. In other words, the main iterator thread can retrieve one data item (e.g., one database record) from the first I/O buffer, return that record to the ML framework, then retrieve one data item (e.g., one database record) from the second I/O buffer, and so on until it has retrieved one item from each I/O buffer. The main iterator thread can then return to the first I/O buffer and retrieve another data item, then to the second I/O buffer to retrieve another data item, and so on. In some implementations, the I/O threads can add additional records to the I/O buffers as the main iterator thread retrieves them. Alternatively, the I/O threads can wait until each of I/O buffers have been emptied before retrieving additional data from the associated partition.

In some implementations, the number of logical partitions can be greater than the number of I/O threads initiated. For example, three threads can be initiated for data that is stored in five partitions. In such instances, the three threads will retrieve the data from each of the first three partitions until all of the data for those partitions has been provided to the ML framework. Subsequently, the first two threads can be repurposed to retrieve the data from the remaining two logical partitions until all of the data from the remaining two partitions has been provided to the ML framework. Note that while this example illustrates particular number of threads and logical partitions, in other implementations, other numbers of threads and partitions can be used.

An example of initiating multiple I/O threads in parallel to retrieve logically partitioned data is illustrated below in conjunction with FIGS. 3A-3D.

FIGS. 3A-3D illustrate initiating multiple I/O threads in parallel to retrieve logically partitioned data in accordance with some embodiments of the present disclosure. In some embodiments, this process can be performed by the parallel iterator component 113 of FIG. 1 and as described above with respect to FIG. 2.

Figure 3A:
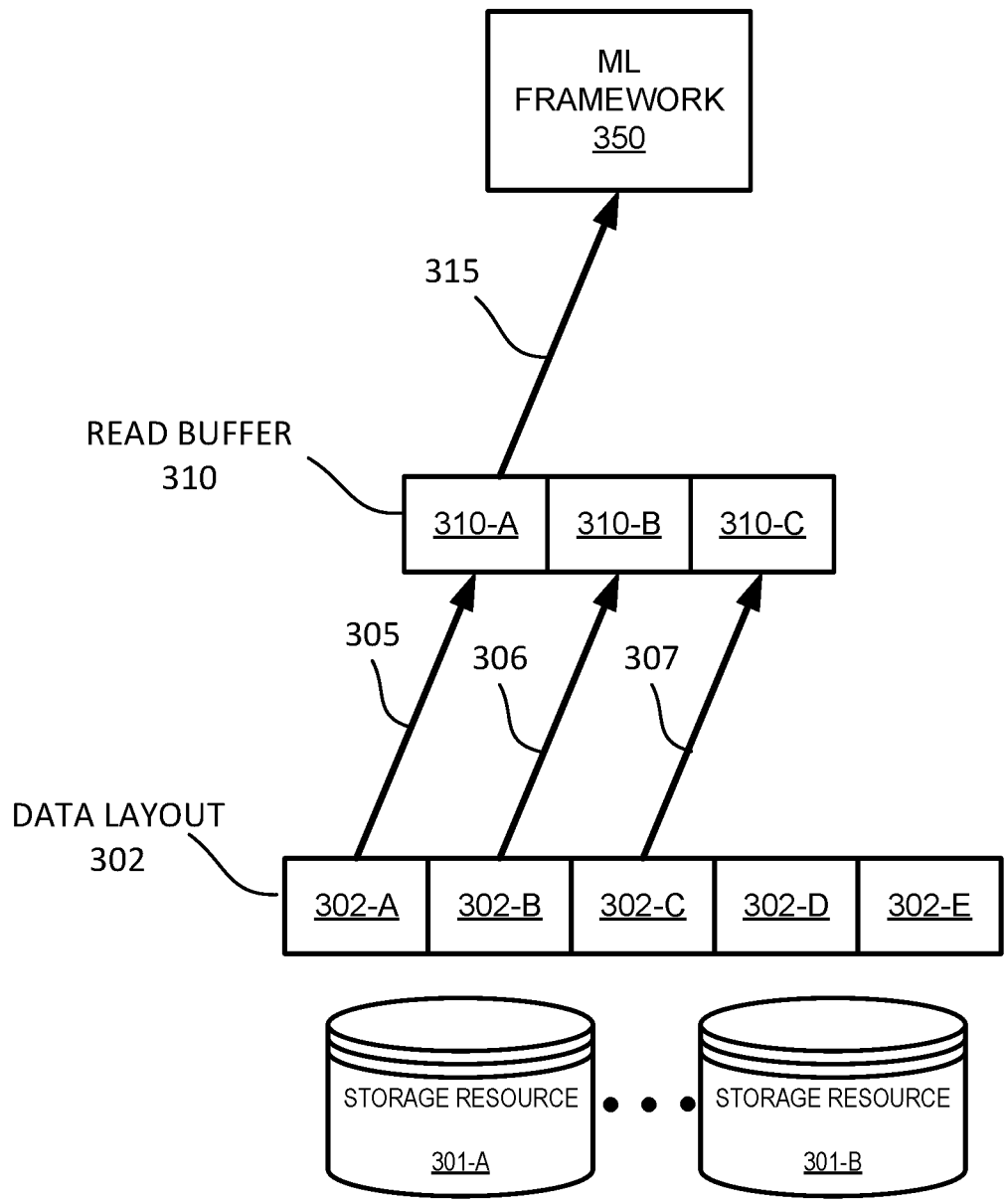
FIGS. 3A-3D illustrate initiating multiple I/O threads in parallel to retrieve logically partitioned data in accordance with some embodiments of the present disclosure.

FIG. 3A illustrates an ML framework 350 that requests training data that is stored on one or more of storage resources 301-A, 301-B. In various implementations, ML framework 350 corresponds to ML Framework 150 of FIG. 1. Storage resources 301-A, 301-B can include memory devices of memory sub-systems such as those described above with respect to memory sub-system 110 and memory devices 130, 140 of FIG. 1. In some implementations, storage resources 301-A, 301-B can be NVMe supported memory devices that are configured with multiple I/O queues to support I/O processing of the data stored on the devices.

As shown in FIG. 3A, the training data requested by ML framework 350 can be stored according to data layout 302. Data layout 302 can include multiple logical partitions 302-A, 302-B, 302-C, 302-D, and 302-E. While for simplicity of illustration only five logical partitions are depicted, in other implementations more or fewer logical partitions can be used for the data stored.

Responsive to receiving the request from the ML framework 350, the parallel iterator component can initiate a set of I/O threads 305, 306, and 307 to retrieve data from logical partitions 302-A, 302-B, and 302-C respectively in parallel. As noted above with respect to FIG. 2, the parallel iterator component can determine the number of I/O threads to initiate based at least in part on attributes of the storage resources 301-A, 301-B and/or the number of logical partitions in data layout 302. While three parallel I/O threads are depicted, in other implementations more or fewer I/O threads can be initiated.

As shown, each I/O thread 305, 306, 307 can retrieve a portion of the data stored from its associated logical partition. Each thread can subsequently store the retrieved portion of data into a read buffer 310 for the I/O thread. Thread 305 can retrieve a portion of data from logical partition 302-A and store that portion in read buffer 310-A, thread 306 can retrieve a portion of data from logical partition 302-B and store that portion of data in read buffer 310-B, and thread 307 can retrieve a portion of data from logical partition 302-C and store that portion of data in read buffer 310-C. As described above, each of the I/O threads 305, 306, and 307 can perform data retrieval in parallel, where each I/O thread can access the storage resources 301-A, 301-B using a separate NVMe I/O queue. Each I/O thread can fill its associated read buffer 310 until that buffer is full. Once a buffer has been filled, the I/O thread for that buffer can pause data retrieval until that buffer has been emptied (e.g., by providing the data in that buffer to ML framework 350).

The parallel iterator component can additionally initiate a main iterator thread 315 that can retrieve data from each read buffer 310 and provide the data from that buffer to the ML framework 350. As described above, in various implementations the main iterator thread 315 can provide the data from each of read buffers 310-A, 310-B, and 310-C using a round robin scheduling scheme. In such instances main iterator thread 315 can retrieve the data from read buffer 310-A and provide it to ML framework 350 until the buffer has been emptied. Once read buffer 310-A has been emptied, the main iterator thread 315 can then proceed to read buffer 301-B, and I/O thread 305 can resume retrieving data from logical partition 302-A to store in read buffer 310-A.

Figure 3B:
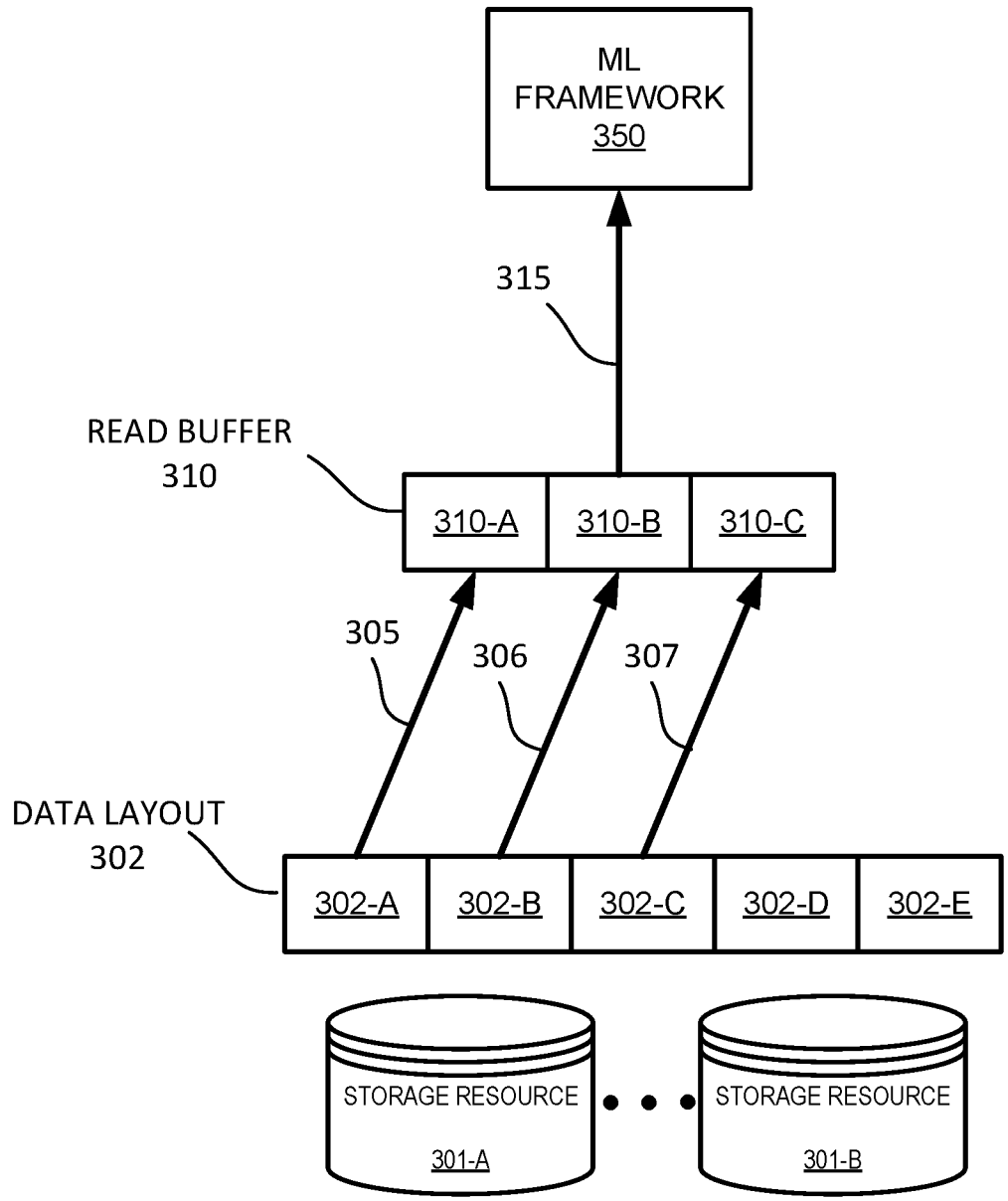

As shown in FIG. 3B, the main iterator thread 315 proceeds to read buffer 310-B to retrieve data from that buffer and provide to ML framework 350. Similar to the steps described above, once all of the data in read buffer 310-B has been provided to ML framework 350 (e.g., read buffer 310-B has been emptied), main iterator thread 315 proceeds to read buffer 310-C and I/O thread 306 resumes retrieving data from logical partition 302-B.

Figure 3C:
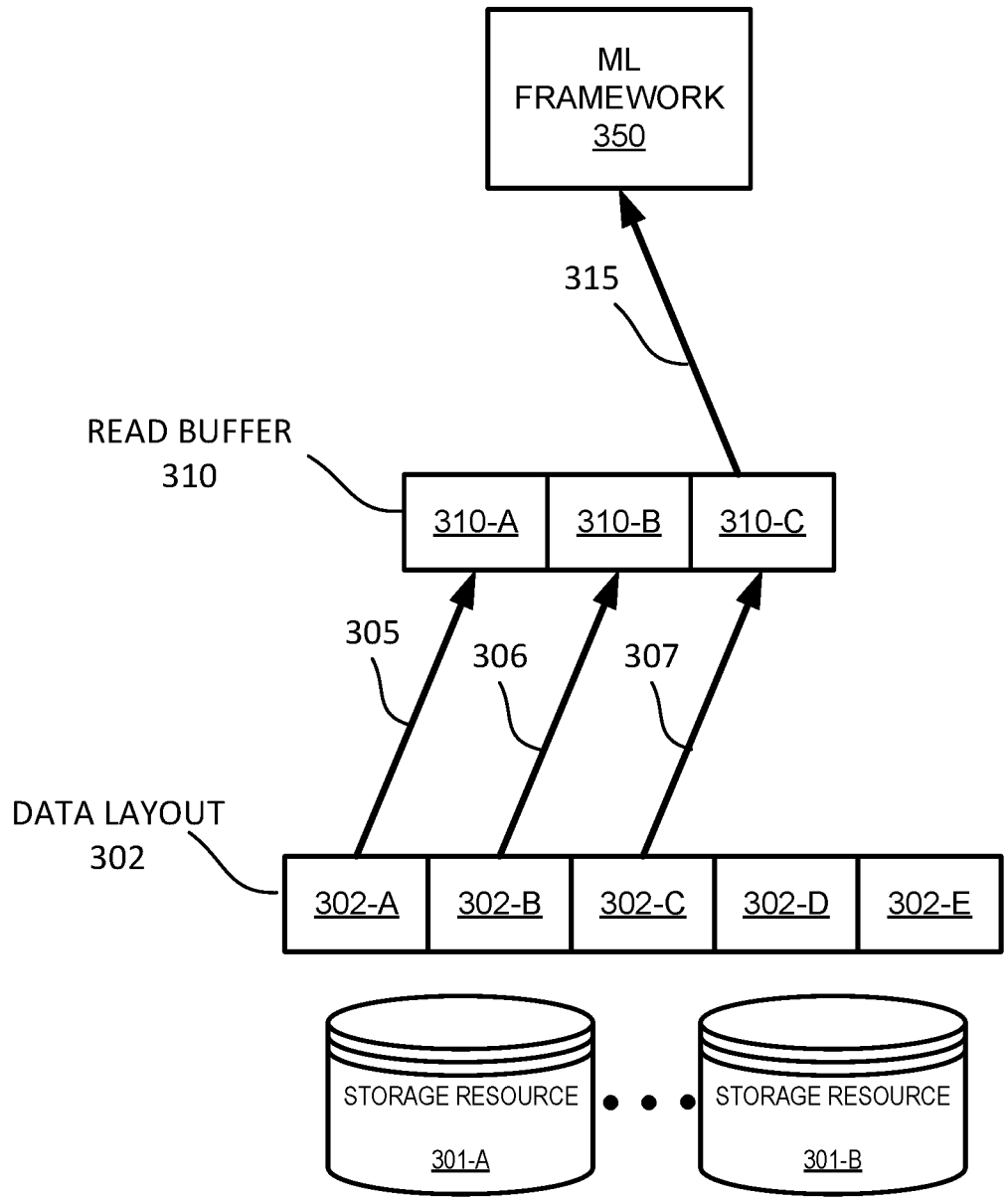

As shown in FIG. 3C, the main iterator thread 315 proceeds to read buffer 310-C to retrieve data from that buffer and provide to ML framework 350. Similar to the steps described above, once all of the data in read buffer 310-C has been provided to ML framework 350 (e.g., read buffer 310-C has been emptied), main iterator thread 315 returns to read buffer 310-A and I/O thread 307 resumes retrieving data from logical partition 302-C. In other implementations, where additional threads are executing in parallel (and other read buffers 310 are present), the main iterator thread 315 would proceed to the next read buffer available.

As noted above with respect to FIG. 2, in some implementations, the main iterator thread 315 can retrieve data from the read buffers 310 one by one from each buffer in a round robin fashion. In other words, the main iterator thread 315 can retrieve one data item (e.g., one database record) from read buffer 310-A, return that record to the ML framework 350, then retrieve one data item (e.g., one database record) from read buffer 310-B, return that record to the ML framework 350, then retrieve one data item (e.g., one database record) from read buffer 310-C, then return that record to the ML framework 350. The main iterator thread 315 can then return to read buffer 310-A (e.g., the first I/O buffer) and retrieve another data item, then to the read buffer 310-B (e.g., the second I/O buffer) to retrieve another data item, and so on. In some implementations, the I/O threads can add additional data to the read buffers 310 as the main iterator thread 315 retrieves and returns data to the ML framework 350. Alternatively, the I/O threads can wait until each of the read buffers 310 have been emptied before retrieving additional data from the associated partition.

Figure 3D:
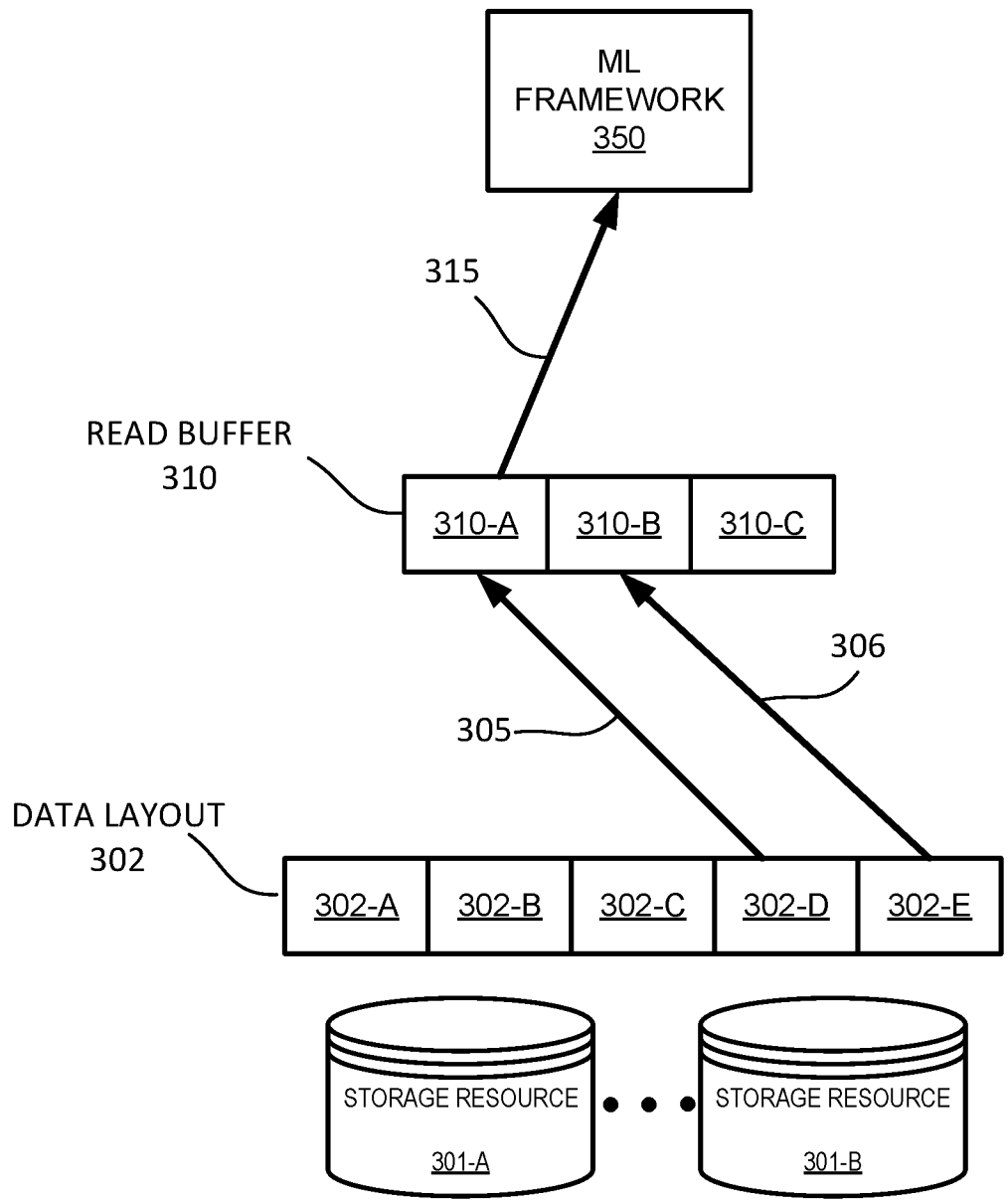

When all of the data for a logical partition has been retrieved, the I/O thread can detect an I/O status that indicates that no additional data has been stored in that partition (e.g., an "end of file" status, or the like). In such instances, the I/O thread can then determine if there are any additional logical partitions to be processed. If so, the I/O thread can retrieve the data from the unprocessed logical partitions. As shown in FIG. 3D, responsive to detecting an end of file (or other similar status indicator) for logical partition 302-A, I/O thread 305 can determine whether an additional partition is present that has not yet been processed. As shown, I/O thread 305 can determine that logical partition 302-D has not yet been processed, and will proceed to retrieve data from that partition into read buffer 310-A. Similarly, I/O thread 306 can retrieve data from logical partition 302-E to be stored in read buffer 310-B. Since no additional logical partitions remain to be processed, I/O thread 307 can store a status indicator that indicates its processing is complete, then self-terminate. In various implementations, the status indicator can be associated with a partition (e.g., for partition 302-C). Alternatively, since a single thread can process multiple partitions, the status indicator can be managed by thread (e.g., for I/O thread 307). The main iterator thread can continue as described above to provide the data from those remaining logical partitions until all of the data from those partitions has been provided to ML framework 350.

Once each of the I/O threads has completed processing all available logical partitions, the main iterator thread can terminate processing and provide a notification to ML framework 350 that indicates all of the data has been provided. For example, main iterator thread 315 can examine the status indicators for each of the I/O threads. If the status indicators for each of the I/O threads indicate that processing is complete (e.g., each thread has reached "end of file" for the applicable logical partitions) then the main iterator thread can terminate.

Figure 4:
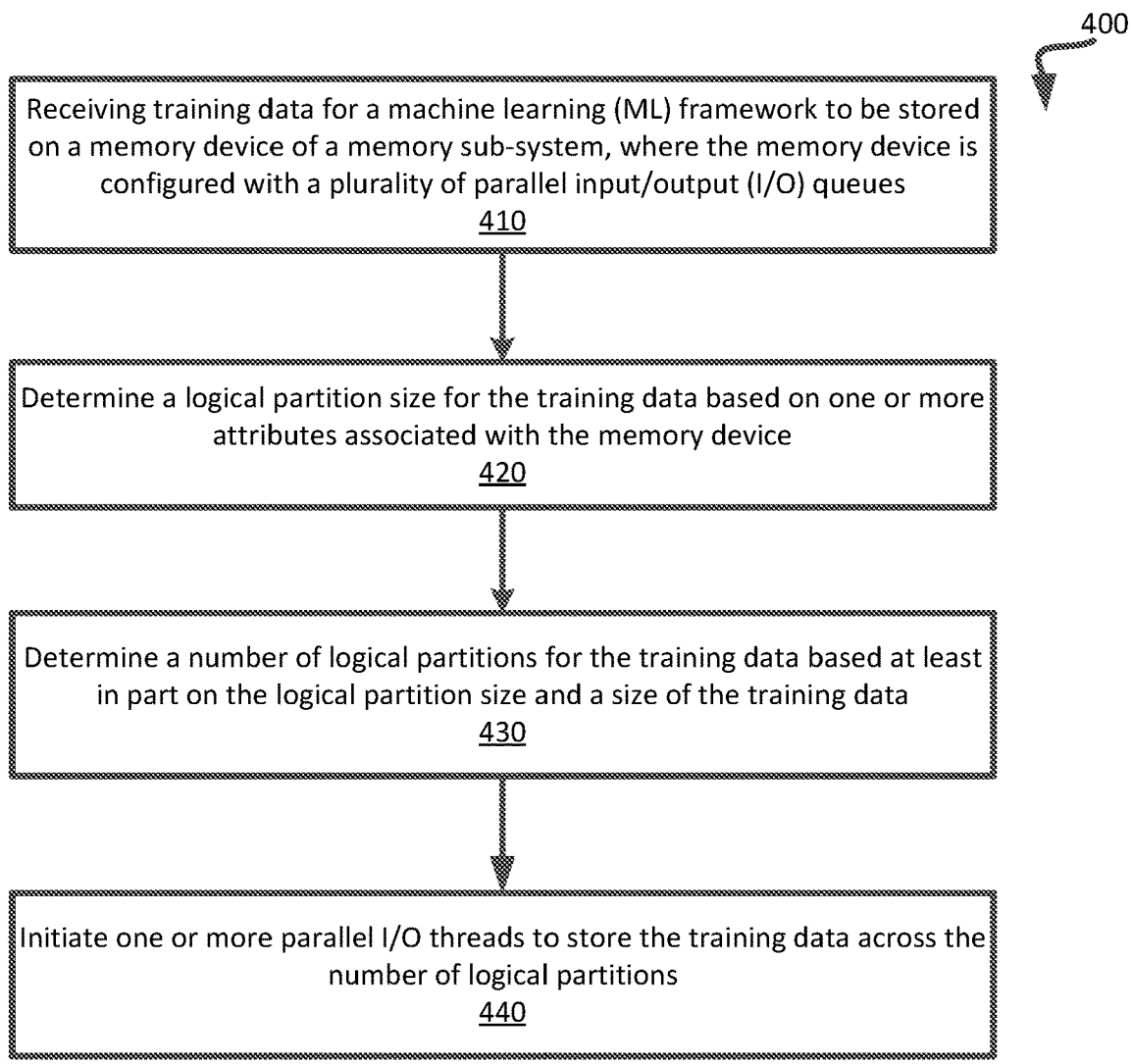
FIG. 4 is a flow diagram of an example method to logically partition training data to be stored in a memory device in accordance with some embodiments.

FIG. 4 is a flow diagram of an example method 400 to logically partition training data to be stored in a memory device in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the parallel iterator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic receives training data for a machine learning (ML) framework to be stored on a memory device of a memory sub-system, where the memory device can be configured with a plurality of parallel input/output (I/O) queues. In various implementations, the memory device can be a non-volatile memory express (NVMe) device configured with multiple I/O queues. As noted above, in some implementations, the training data can be a very large data set used to train the ML framework. For example, the data can be a set of training images that can be used to train an ML framework to identify and categorize a new image received by the ML framework once the training process has been completed. In other implementations, other types of data can be received for other types of classification purposes.

At operation 420, the processing logic determines a logical partition size for the training data based on one or more attributes associated with the memory device. In some implementations, the attributes associated with the memory device can include at least one of a number of bits stored per memory cell for the memory device, a number of layers associated with the memory device (e.g., for three-dimensional memory devices such as "3D cross-point"), or a number of parallel I/O queues associated with a memory device (e.g., for memory devices configured as NVMe devices).

At operation 430, the processing logic determines a number of logical partitions for the training data based at least in part on the logical partition size and a size of the training data. In such instances, once the logical partition size has been determined, the processing device can determine the size of the training data and apportion the training data across the logical partitions by dividing the total size of the training data by the logical partition size.

At operation 440, the processing logic initiates one or more parallel I/O threads to store the training data across the number of logical partitions. In some implementations, a single thread can be initiated to store the training data across the logical partitions. Alternatively, multiple parallel I/O threads can be initiated to store the data so each partition is assigned to a dedicated I/O thread. In such instances, each of the parallel I/O threads can store data to the memory device using a separate I/O queue for the memory device.

In an illustrative example, the processing device can select a portion of the training data to be stored in a logical partition. The processing device can then assign a unique identifier for the logical partition and update the selected portion of the data to include the unique identifier. In some implementations, the unique identifier can be assigned as a prefix to the key of the data being stored. Each data item for the portion of the training data assigned to the partition logically organized within the data store by its partition identifier. Subsequently, when the data is to be retrieved according to its logical partition, the parallel iterator process as described above with respect to FIG. 2 and FIGS. 3A-3D can create a cursor using the partition identifier as part of the key. In various implementations, the processing device can use the number of logical partitions determined at operation 430 to set the upper bound of the prefix value and number the logical partitions sequentially from a starting value for the total number of partitions. Alternatively, other types of identifiers can be used (e.g., alphabetic characters, alphanumeric character strings, a series of binary values, a series of hexadecimal values, etc.).

Figure 5:
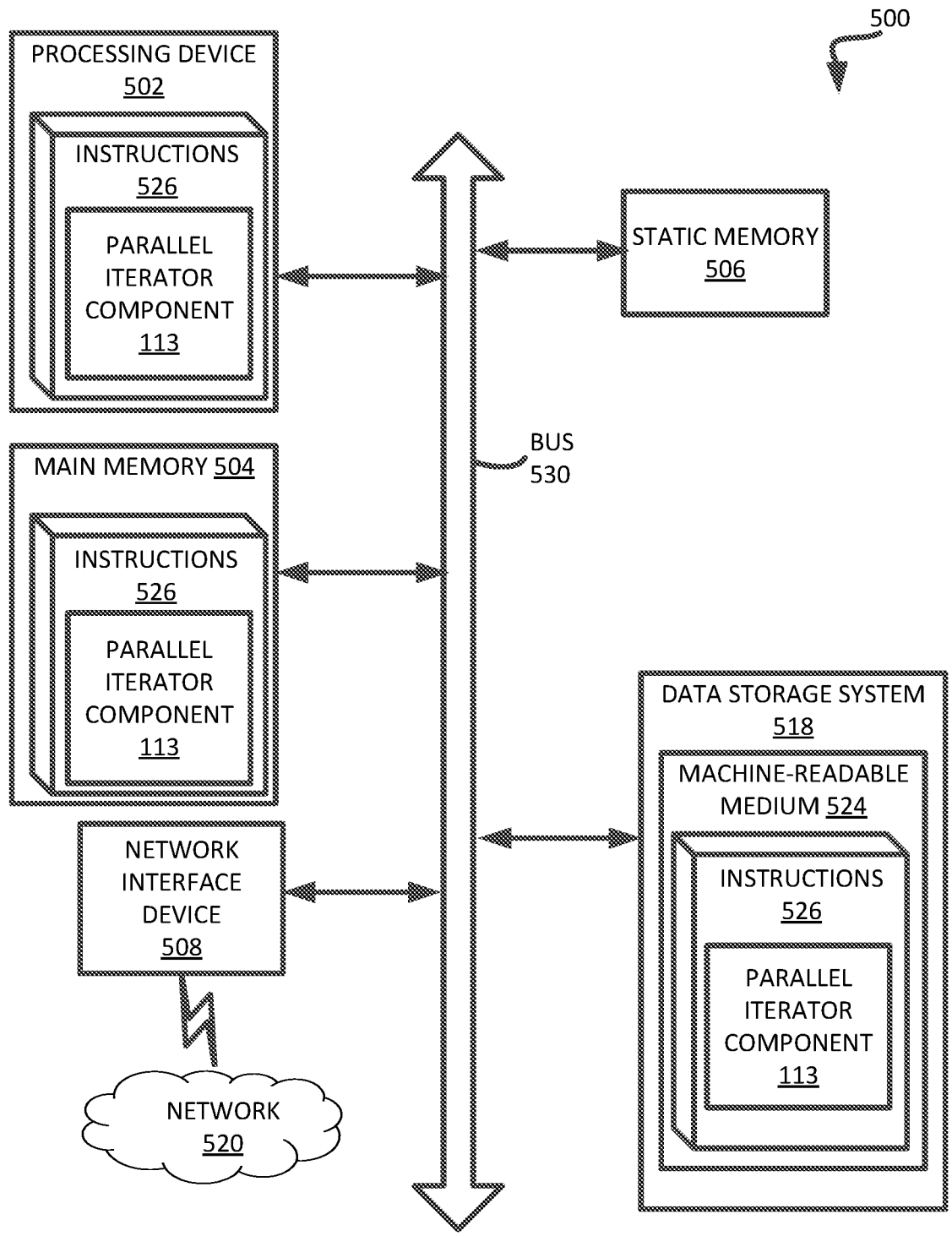
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to adaptive seasoning component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 626 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a parallel iterator component (e.g., the parallel iterator component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, from a machine learning (ML) framework executing on a host system, a request to retrieve data from a memory device of a memory sub-system, wherein the data comprises a plurality of logical partitions; and
    initiating, based at least in part on a media type associated with the memory device, a set of parallel I/O threads to retrieve the data from the memory device, wherein each parallel I/O thread of the set of parallel I/O threads retrieves a different portion of the data from a different corresponding logical partition of the plurality of logical partitions and stores the different portion of the data in a I/O buffer of a set of I/O buffers corresponding to the set of parallel I/O threads in parallel.

2. The method of claim 1, wherein initiating the set of parallel I/O threads further comprises:
    determining a number of parallel I/O threads based at least in part on the media type associated with the memory device; and
    initiating the number of parallel I/O threads for the memory device.

3. The method of claim 2, wherein determining the number of parallel I/O threads further comprises:
    determining a number of parallel I/O queues supported by the memory device; and
    determining a queue depth associated with each parallel I/O queue of the number of parallel I/O queues.

4. The method of claim 1, wherein initiating the set of parallel I/O threads further comprises:
    initiating a parallel I/O thread from the set of parallel I/O threads for each logical partition of a first set of logical partitions of the plurality of logical partitions;
    determining data is retrieved from each logical partition of the first set of logical partitions of the plurality of logical partitions; and
    repurposing one or more parallel I/O threads from the set of parallel I/O threads for each logical partition of a second set of logical partitions of the plurality of logical partitions.

5. The method of claim 1, wherein successively providing the different portion of the data from each I/O buffer comprises providing the different portion of the data from each I/O buffer in a round robin fashion.

6. The method of claim 1, further comprising:
    determining a number of parallel I/O threads responsive to retrieving a number stored.

7. The method of claim 6, wherein the number indicates an optimal number of parallel I/O threads based on an observed performance statistic.

8. A system comprising:
    a memory device; and
    a processing device, operatively coupled with the memory device, to perform operations comprising:
        receiving training data for a machine learning (ML) framework to be stored on the memory device of a memory sub-system, wherein the memory device is configured with a plurality of parallel input/output (I/O) queues; and
        determining a logical partition size for the training data based on one or more attributes associated with the memory device.

9. The system of claim 8, wherein the memory device comprises a non-volatile memory express (NVMe) device.

10. The system of claim 8, wherein the one or more attributes associated with the memory device comprises at least one of a number of bits stored per memory cell for the memory device, a number of layers associated with the memory device, or a number of parallel I/O queues associated with the memory device.

11. The system of claim 8, wherein the processing device is to perform operations further comprising:
    determining a size of the training data; and
    calculating a number of logical partitions by dividing the size of the training data by the logical partition size.

12. The system of claim 8, wherein the processing device is to perform operations further comprising:
    selecting a portion of the training data to be stored in a logical partition;
    assigning a unique identifier for the logical partition;
    updating the portion of the training data to include the unique identifier for the logical partition; and
    storing the updated portion of the training data on the memory device.

13. The system of claim 8, wherein the processing device is to perform operations further comprising:
    initiating a set of parallel I/O threads to store the training data to the memory device, wherein each parallel I/O thread of the set of parallel I/O threads selects a different portion of the training data for a different corresponding logical partition and stores the different portion of the training data using a corresponding parallel I/O thread for the memory device.

14. A non-transitory computer readable medium comprising instructions, which when executed by a processing device, cause the processing device to perform operations comprising:
    receiving, from a machine learning (ML) framework executing on a host system, a request to retrieve data from a memory device of a memory sub-system, wherein the data comprises a plurality of logical partitions; and
    initiating, based at least in part on a media type associated with the memory device, a set of parallel I/O threads to retrieve the data from the memory device, wherein each I/O thread of the set of parallel I/O threads retrieves a different portion of the data from a different corresponding logical partition of the plurality of logical partitions and stores the different portion of the data in a I/O buffer of a set of I/O buffers corresponding to the set of parallel I/O threads in parallel.

15. The non-transitory computer readable medium of claim 14, the operations further comprise:
    determining a number of parallel I/O threads based at least in part on the media type associated with the memory device; and
    initiating the number of parallel I/O threads for the memory device.

16. The non-transitory computer readable medium of claim 15, wherein to determine the number of parallel I/O threads the operations further comprise:
    determining a number of parallel I/O queues supported by the memory device; and
    determining a queue depth associated with each parallel I/O queue of the number of parallel I/O queues.

17. The non-transitory computer readable medium of claim 14, wherein successively providing the different portion of the data from each I/O buffer comprises providing the different portion of the data from each I/O buffer in a round robin fashion.

18. The non-transitory computer readable medium of claim 14, wherein to initiate the set of parallel I/O threads, the operations further comprise:

initiating a parallel I/O thread from the set of parallel I/O threads for each logical partition of a first set of logical partitions of the plurality of logical partitions;

determining data is retrieved from each logical partition of the first set of logical partitions of the plurality of logical partitions; and repurposing one or more parallel I/O threads from the set of parallel I/O threads for each logical partition of a second set of logical partitions of the plurality of logical partitions.

19. The non-transitory computer readable medium of claim 14, the operations further comprises:

determining a number of parallel I/O threads responsive to retrieving a number stored.

20. The non-transitory computer readable medium of claim 19, wherein the number indicates an optimal number of parallel I/O threads based on an observed performance statistic.

\* \* \* \* \*